United States Patent
Hirai et al.

(10) Patent No.: US 7,447,398 B2
(45) Date of Patent: Nov. 4, 2008

(54) OPTICAL CROSSCONNECT APPARATUS

(75) Inventors: Tooru Hirai, Yokohama (JP); Yasuyuki Fukashiro, Yokohama (JP)

(73) Assignee: Hitachi Communication Technologies, Ltd., Tokyo (JP)

(*) Notice: Subject to any disclaimer, the term of this patent is extended or adjusted under 35 U.S.C. 154(b) by 0 days.

(21) Appl. No.: 11/482,753

(22) Filed: Jul. 10, 2006

(65) Prior Publication Data

US 2007/0189663 A1   Aug. 16, 2007

(30) Foreign Application Priority Data

Feb. 1, 2006   (JP)   ............................. 2006-024175

(51) Int. Cl.
*G02B 6/35* (2006.01)
*H04J 14/00* (2006.01)

(52) U.S. Cl. .......................................... 385/17; 398/50

(58) Field of Classification Search ................... 385/17; 398/50
See application file for complete search history.

(56) References Cited

U.S. PATENT DOCUMENTS

| 5,005,166 A * | 4/1991 | Suzuki et al. ................. 398/47 |
| 6,862,380 B2 * | 3/2005 | Chaudhuri et al. ............ 385/17 |
| 2003/0198227 A1 | 10/2003 | Matsuura et al. |

FOREIGN PATENT DOCUMENTS

| JP | 2003-209863 | 7/2003 |
| JP | 2003-339064 | 11/2003 |
| JP | 2004-297238 | 10/2004 |

* cited by examiner

*Primary Examiner*—Sung Pak
*Assistant Examiner*—Jerry T Rahll
(74) *Attorney, Agent, or Firm*—Antonelli, Terry, Stout & Kraus, LLP.

(57) ABSTRACT

In working path setting, a backup path is previously prepared assuming a link failure, and a demultiplexer of a bypass link is connected to a wavelength conversion repeater through an optical switch. Upon occurrence of a link failure, the wavelength conversion repeater is connected to a multiplexer of the bypass link by means of the optical switch to forward an in-channel control signal to the wavelength conversion repeater of an adjacent node where the in-channel control signal is sequentially forwarded to reserve a backup bandwidth. Then, output wavelengths and targets are exchanged between a wavelength tunable transponder and the wavelength tunable repeater.

14 Claims, 16 Drawing Sheets

FIG. 11A

NODE #2

T2

| STANDBY WAVELENGTH TUNABLE REPEATER NO. | WORKING PATH | | BACKUP PATH | | | |
|---|---|---|---|---|---|---|
| | PATH NO. | ASSUMED FAILURE | INPUT | | OUTPUT | |
| | | | FIBER | WAVELENGTH | FIBER | WAVELENGTH |
| T2-1  #1 | #1 | LINK #2-4 | LINK #2-3 | λ2 | LINK #2-3 | λ2 |

FIG. 11B

NODE #3

T3

| STANDBY WAVELENGTH TUNABLE REPEATER NO. | WORKING PATH | | BACKUP PATH | | | |
|---|---|---|---|---|---|---|
| | PATH NO. | ASSUMED FAILURE | INPUT | | OUTPUT | |
| | | | FIBER | WAVELENGTH | FIBER | WAVELENGTH |
| T3-1  #3 | #1 | LINK #2-4 | LINK #2-3 | λ2 | LINK #3-4 | λ3 |
| T3-2  #4 | #1 | LINK #2-4 | LINK #3-4 | λ3 | LINK #2-3 | λ2 |

FIG. 11C

NODE #4

T4

| STANDBY WAVELENGTH TUNABLE REPEATER NO. | WORKING PATH | | BACKUP PATH | | | |
|---|---|---|---|---|---|---|
| | PATH NO. | ASSUMED FAILURE | INPUT | | OUTPUT | |
| | | | FIBER | WAVELENGTH | FIBER | WAVELENGTH |
| T4-1  #1 | #1 | LINK #2-4 | LINK #3-4 | λ3 | LINK #3-4 | λ3 |

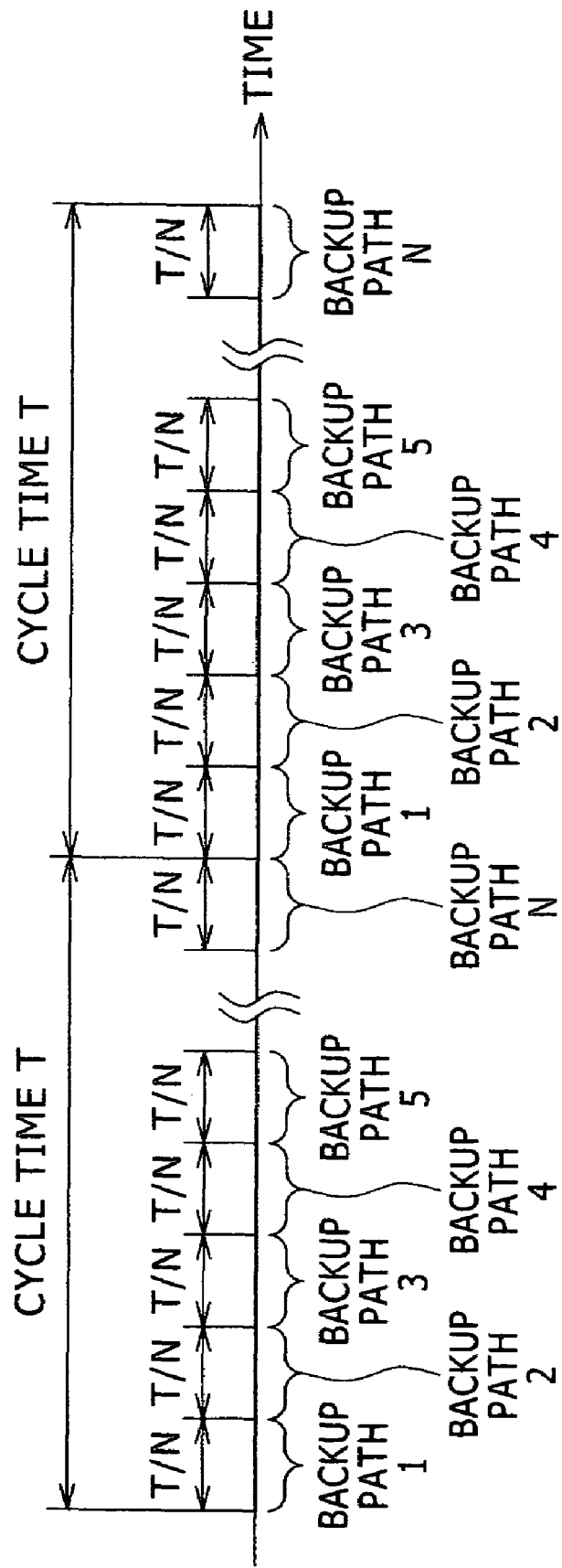

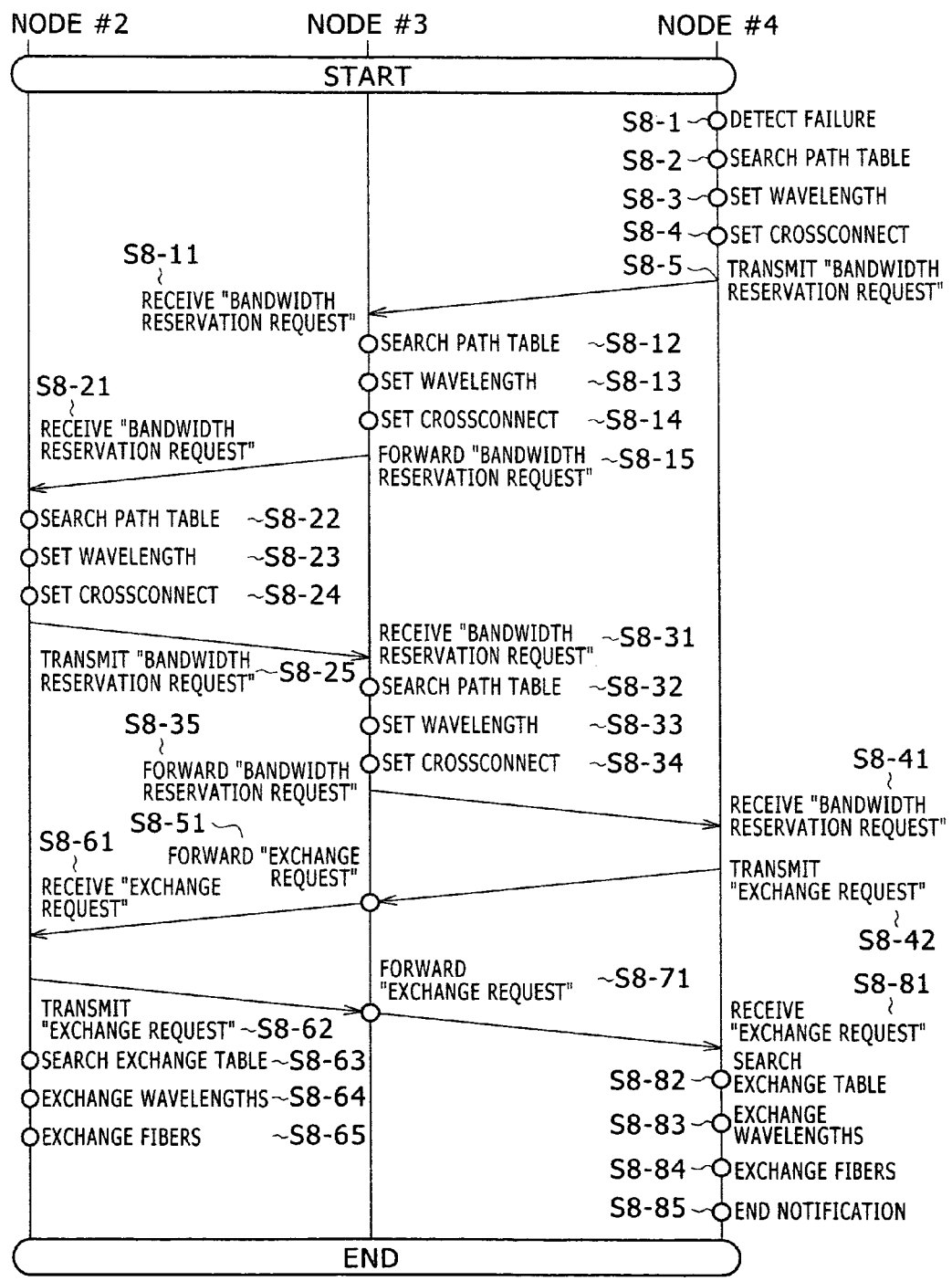

FIG. 15A

NODE #2

T2

| STANDBY WAVELENGTH TUNABLE REPEATER NO. | WORKING PATH | | BACKUP PATH | | | |
|---|---|---|---|---|---|---|
| | PATH NO. | ASSUMED FAILURE | INPUT | | OUTPUT | |
| | | | FIBER | WAVELENGTH | FIBER | WAVELENGTH |
| #1 | #1 | LINK #2-4 | LINK #2-3 | λ2 | LINK #2-3 | λ2 |

NODE #3

T3

| STANDBY WAVELENGTH TUNABLE REPEATER NO. | WORKING PATH | | BACKUP PATH | | | |
|---|---|---|---|---|---|---|
| | PATH NO. | ASSUMED FAILURE | INPUT | | OUTPUT | |
| | | | FIBER | WAVELENGTH | FIBER | WAVELENGTH |
| #3 | #1 | LINK #2-4 | LINK #2-3 | λ2 | LINK #3-4 | λ3 |
| #4 | #1 | LINK #2-4 | LINK #3-4 | λ3 | LINK #2-3 | λ2 |

NODE #4

T4

| STANDBY WAVELENGTH TUNABLE REPEATER NO. | WORKING PATH | | BACKUP PATH | | | |
|---|---|---|---|---|---|---|
| | PATH NO. | ASSUMED FAILURE | INPUT | | OUTPUT | |
| | | | FIBER | WAVELENGTH | FIBER | WAVELENGTH |
| #1 | #1 | LINK #2-4 | LINK #3-4 | λ3 | LINK #3-4 | λ3 |

NODE #2

T2

| PATH NO. | ASSUMED FAILURE | SOURCE | DESTINATION ROUTE/WAVELENGTH | | | |
|---|---|---|---|---|---|---|
| | | | NORMAL CONDITION | | FAILURE CONDITION | |
| | | | FIBER | WAVELENGTH | FIBER | WAVELENGTH |
| #1 | LINK #2-4 | TRANSPONDER #1 | LINK #2-4 | λ1 | LINK #2-3 | λ2 |
| | | REPEATER #1 | LINK #2-3 | λ2 | LINK #2-4 | λ1 |

NODE #4

T4

| PATH NO. | ASSUMED FAILURE | SOURCE | DESTINATION ROUTE/WAVELENGTH | | | |
|---|---|---|---|---|---|---|
| | | | NORMAL CONDITION | | FAILURE CONDITION | |
| | | | FIBER | WAVELENGTH | FIBER | WAVELENGTH |
| #1 | LINK #2-4 | TRANSPONDER #1 | LINK #2-4 | λ1 | LINK #3-4 | λ3 |
| | | REPEATER #1 | LINK #3-4 | λ3 | LINK #2-4 | λ1 |

T4-11

OPTICAL CROSSCONNECT APPARATUS

CLAIM OF PRIORITY

The present application claims priority from Japanese patent application serial no. 2006-024175, filed on Feb. 1, 2006, the content of which is hereby incorporated by reference into this application.

BACKGROUND OF THE INVENTION

The present invention relates to an optical crossconnect apparatus, and more particularly to an optical crossconnect apparatus having a failure recovery function through the use of in-channel signals.

Because of the explosive growth of traffic along with the diffusion of the Internet, as well as the development of optical switching technology such as a MEMS based optical switch, there is a demand for large-scale optical crossconnect apparatus to be put into practical use.

It is important for the optical crossconnect apparatus to have an optical path setting function for managing a wavelength as a path and a failure recovery function for network failure.

In Japanese Patent Publication Laid-Open No. 2004-297238, there is described an optical crossconnect apparatus that helps relieve a line using overhead information of the OTN (Optical Transport Network) frame. This optical crossconnect apparatus can forward in-band control signals (in-channel control signals), which makes it possible to provide path failover upon occurrence of a failure by controlling an adjacent optical crossconnect apparatus. Meanwhile, for the above-described optical crossconnect apparatus, it is necessary to perform OEO conversion (optical-electrical-optical conversion) twice per node, and which tends to increase cost.

Further, in JP-A No. 2003-209863 and JP-A No. 2003-339064, there are described optical crossconnect apparatuses that connect the input/output of a wavelength conversion repeater capable of converting to any wavelength, to an optical switch, and can select the route and wavelength channel for the use of the wavelength conversion repeater. These optical crossconnect apparatuses make it possible to reduce the number of OEO conversions to less than or equal to once per node, when using the OEO conversion for wavelength conversion. However, the above-described optical crossconnect apparatus is provided with an optical switch between a demultiplexer and the wavelength conversion repeater, and cannot receive in-channel control signals transmitted to the wavelength conversion repeater of the own node from the wavelength conversion repeater of another node. In addition, the above-described optical crossconnect apparatus is provided with the optical switch between the wavelength conversion repeater and a multiplexer, and cannot transmit the in-channel control signals from the wavelength conversion repeater of the own node to the wavelength conversion repeater of another node.

Incidentally, the specification of U.S. Pat. No. 2003/0198227 is the US counterpart of JP-A No. 2003-339064.

The present invention provides an optical crossconnect apparatus capable of using in-channel control signals for switching control of optical crossconnect paths so that the optical path can avoid the failed part upon occurrence of a failure, improving efficiency in use of a tunable wavelength conversion repeater shared for backup purposes, while reducing the number of OEO conversions.

SUMMARY OF THE INVENTION

An optical crossconnect apparatus according to an embodiment of the present invention includes: a monitoring controller; an optical switch having L input terminals and L output terminals to connect any input terminal and any output terminal; N demultiplexers for demultiplexing a wavelength multiplexed signal with the maximum number of wavelengths M; N multiplexers for multiplexing the optical signal with the maximum number of M-waves; a wavelength tunable transponder for accommodating a client signal, converting the signal into any wavelength to output to the optical switch as well as performing the reverse conversion thereof, and further processing in-channel monitoring control information under control from the monitoring controller; a wavelength tunable repeater for receiving an optical signal from the output terminal of the optical switch, converting the signal into any wavelength after reproduction, and outputting again the converted signal to the input terminal of the optical switch, as well as processing the in-channel monitoring control information under control from the monitoring controller; and a network management apparatus, wherein the optical crossconnect apparatus previously prepares a backup path assuming a link failure in the setting of the working path to always connect the input of the wavelength tunable repeater to the demultiplexer of a bypass link, and when transmitting an in-channel control signal, connects the output of the wavelength tunable repeater to the multiplexer of the bypass link by means of the optical switch.

Upon occurrence of a link failure, the optical crossconnect apparatus connects the wavelength tunable repeater and the multiplexer of the bypass link by means of the optical switch to forward an in-channel control of a bandwidth reservation request to the wavelength tunable repeater of the adjacent node. Then, the optical crossconnect apparatus sequentially forwards the in-channel control to the bypass node to reserve the alternative link for the link failure, and then exchanges the output wavelength and the link destination of the connection between the wavelength tunable transponder and the wavelength tunable repeater.

BRIEF DESCRIPTION OF THE DRAWINGS

Preferred embodiments of the present invention will now be described in conjunction with the accompanying drawings, in which:

FIGS. 11A to 11C are diagrams showing path tables stored in route-wavelength management information DBs of respective nodes;

FIG. 12 is a timing diagram illustrating the time allocation for the backup path pre-health confirmation;

FIG. 13 is a sequence diagram illustrating a restoration operation;

FIGS. 15A to 15C are diagrams showing path tables (bandwidth reservation) stored in the route-wavelength management information of the respective nodes;

FIGS. 17A and 17B are diagrams showing path tables (exchange) stored in the route-wavelength management information of the respective nodes.

DESCRIPTION OF THE PREFERRED EMBODIMENT

Figure 1:
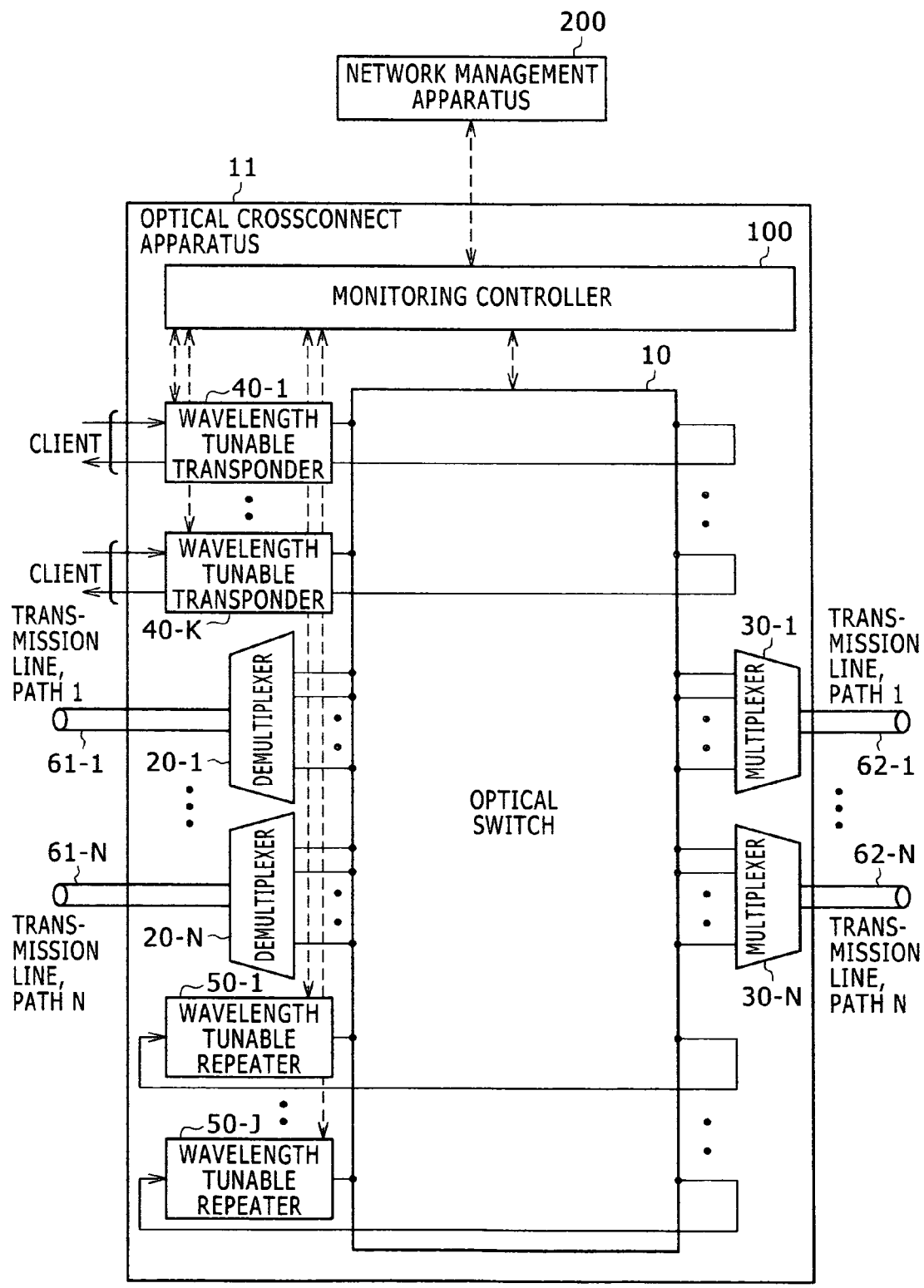
FIG. 1 is a block diagram illustrating the general configuration of an optical crossconnect apparatus and a network management apparatus.

Hereinafter, preferred embodiments of the present invention will be described using an exemplary embodiment with reference to the accompanying drawings. It is to be noted that the same reference numerals are assigned to the same portions and their description will not be repeated.

Embodiment 1

An optical crossconnect apparatus 11 shown in FIG. 1 includes: a monitoring controller 100; an optical switch 10 having L input terminals and L output terminals to connect any input terminal to any output terminal; demultiplexers 20-1 to 20-N for demultiplexing a wavelength multiplexed signal with the maximum number of wavelengths M from a transmission line; multiplexers 30-1 to 30-N for wavelength multiplexing the optical signal with the maximum number of M-waves; wavelength tunable transponders 40-1 to 40-K for accommodating a client signal, converting the signal to any wavelength to output the converted signal to the optical switch, as well as performing the reverse conversion thereof; and wavelength tunable repeaters 50-1 to 50-J for receiving an optical signal from the output terminal of the optical switch 10, converting the signal to any wavelength after reproduction, and outputting again to the input terminal of the optical switch 10, as well as processing in-channel monitoring control information under control from the monitoring controller 100. Incidentally, the number of the input/output terminals L of the optical switch 10 is equal to or more than (M×N+K+J), where J is a natural number that is equal to or less than L−(M×N+K). The optical crossconnect apparatus 11 is connected to a network management apparatus 200 by the monitoring controller 100.

Figure 2:
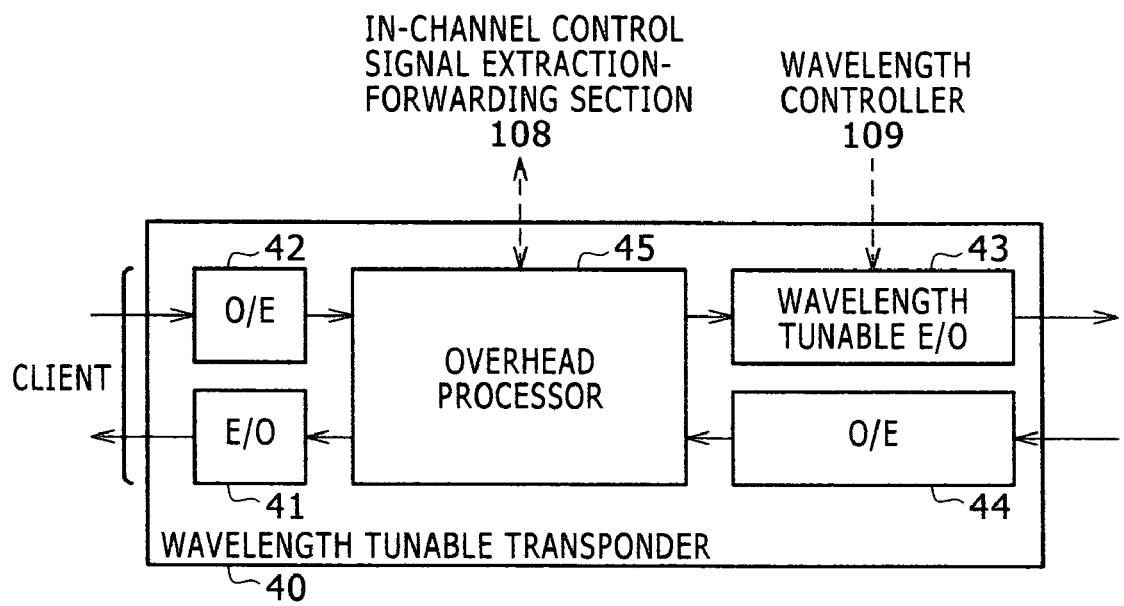
FIG. 2 is a block diagram illustrating the detailed configuration of a wavelength tunable transponder of the optical crossconnect apparatus.

The wavelength tunable transponder 40 shown in FIG. 2 includes: an optical transmitter 41 and an optical receiver 42 that serve as input/output interfaces with a client device; a wavelength tunable optical transmitter 43 and an optical receiver 44 that are connected to the optical switch 10; and an overhead processor 45 for providing overhead processing for a signal from the optical receiver 42 to transmit the signal to the wavelength tunable optical transmitter 43, and also providing overhead processing for a signal from the optical receiver 44 to transmit the signal to the optical transmitter 41. Incidentally, the overhead processor 45 makes communication with an in-channel control signal extraction-forwarding section 108 of the monitoring controller 100 to insert an in-channel monitoring control signal into the output signal to the wavelength tunable repeater, and demultiplexes the in-channel monitoring control signal from the signal from the optical receiver 44. The overhead processor 45, which has a function of monitoring out-of-frame errors and code errors, may further has a function of correcting the code errors by increasing the transmission speed in the transmission line side higher than the transmission speed in the client side, according to the necessity.

Incidentally, the optical receiver 44 can receive any 1 wave of M waves used for wavelength multiplexing of the transmission line. This is because the dynamic range of the optical receiver 44 for wavelength is wide. The wavelength tunable transmitter 43 for transmitting the optical signal to the optical switch transmits any wavelength under control of a wavelength controller 109 of the monitoring controller 100.

Figure 3:
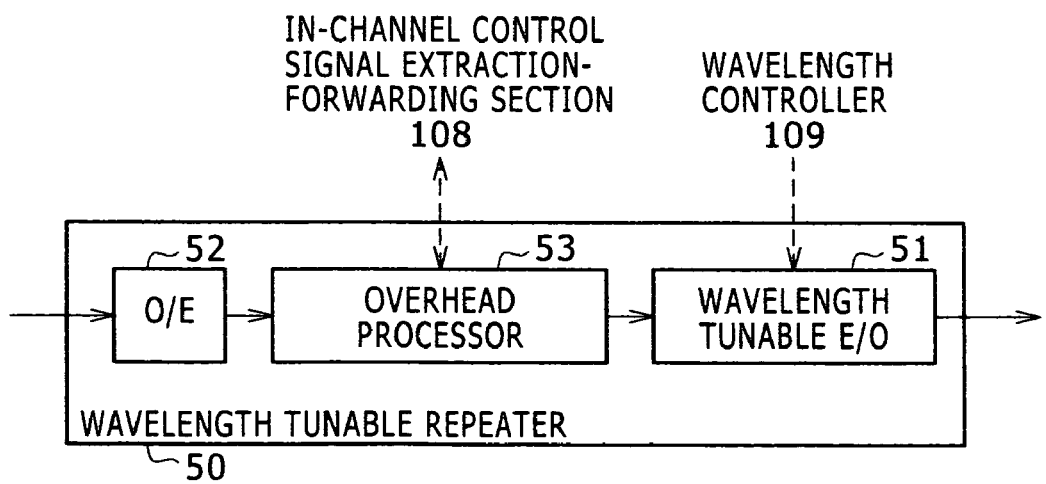
FIG. 3 is a block diagram illustrating the detailed configuration of a wavelength tunable repeater of the optical crossconnect apparatus.

The wavelength tunable repeater 50 shown in FIG. 3 includes: a wavelength tunable optical transmitter 51 and an optical receiver 52 that are connected to the optical switch 10; and an overhead processor 53 for providing overhead processing for a signal from the optical receiver 52 and transmits the signal to the wavelength tunable optical transmitter 51. Incidentally, the overhead processor 53 makes communication with the in-channel control signal extraction-forwarding section 108 of the monitoring controller 100 to insert an in-channel monitoring control signal into the output signal to the wavelength tunable optical transmitter 51, and demultiplexes the in-channel monitoring control signal included in the signal from the optical receiver 52. In addition, the overhead processor 53 has a function of monitoring out-of-frame errors and code errors. Incidentally, the overhead processor 53 may further have a function of correcting the code errors.

The optical receiver 52 can receive any 1 wave of M waves used for wavelength multiplexing of the transmission line. This is because the dynamic range of the optical receiver 44 for wavelength is wide. The wavelength tunable optical transmitter 51 for transmitting the optical signal to the optical switch transmits any wavelength under control of the wavelength controller 109 of the monitoring controller 100.

Figure 4:
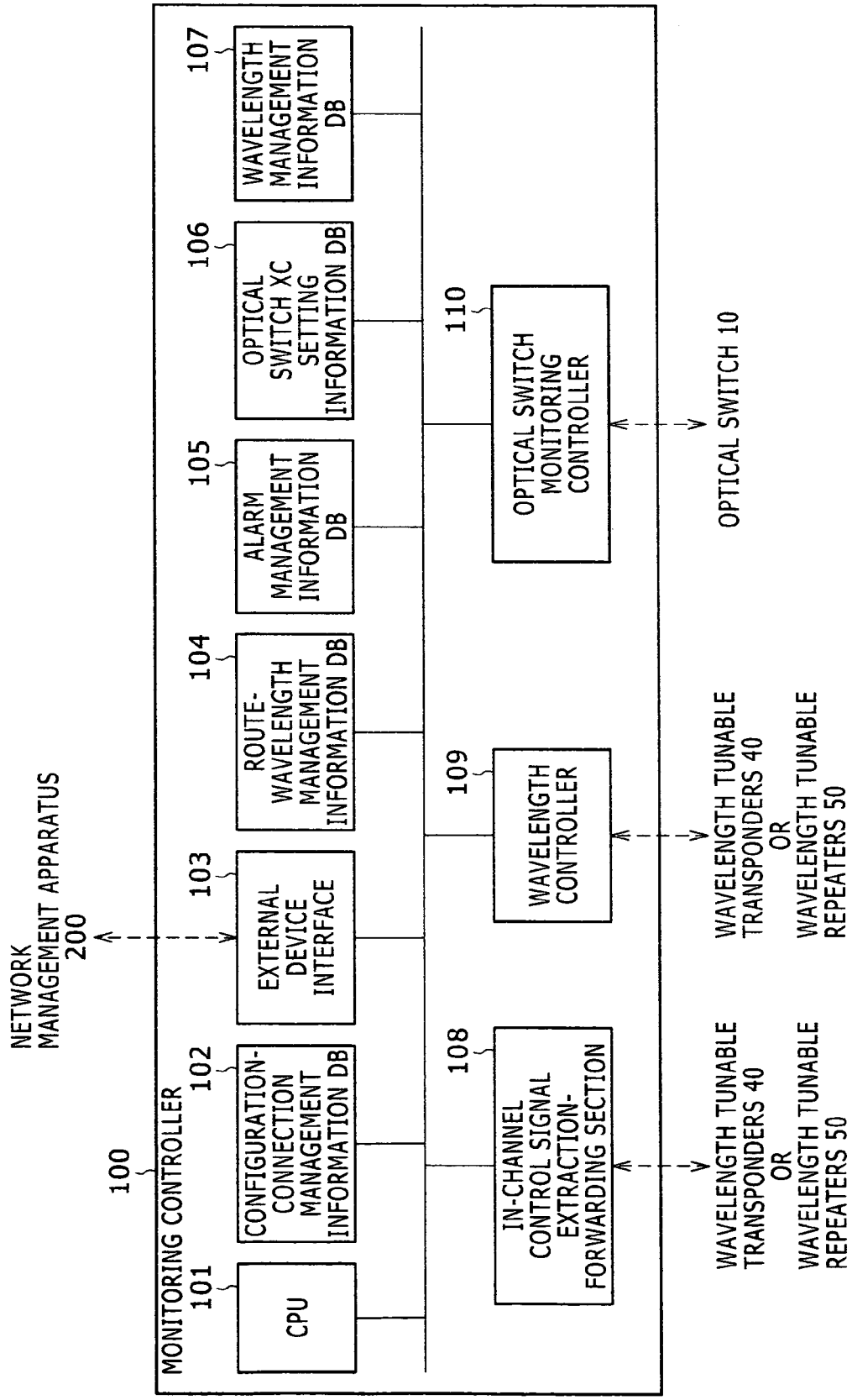
FIG. 4 is a block diagram illustrating the detailed configuration of a monitoring controller of the optical crossconnect apparatus.

The monitoring controller 100 shown in FIG. 4 includes: a CPU 101; a configuration-connection management information DB 102 for managing the machine configuration and the components connected to all the input/output ports of the optical switch; a route-wavelength management information DB 104 for managing the routes and used wavelengths of the working path and a backup path; an alarm management information DB 105 for managing the machine alarm and the communication alarm; the in-channel control signal extraction-forwarding section 108 for extracting and forwarding a control signal to the wavelength tunable transponder 40 and the wavelength tunable repeater 50 as well as a main signal; the wavelength controller 109 for specifying the setting wavelengths of the wavelength tunable transponders 40 and the wavelength tunable repeaters 50; an optical switch monitoring controller 110 for making crossconnect setting for the optical switch 10 and monitoring the setting state; an optical switch crossconnect setting information DB 106 for storing the crossconnect setting information monitored in the optical switch monitoring controller 110; a wavelength management information DB 107 for managing the wavelengths specified in the wavelength controller 109; and an external device interface 103 having an interface capable of communicating with the network management apparatus 200.

Figure 5:
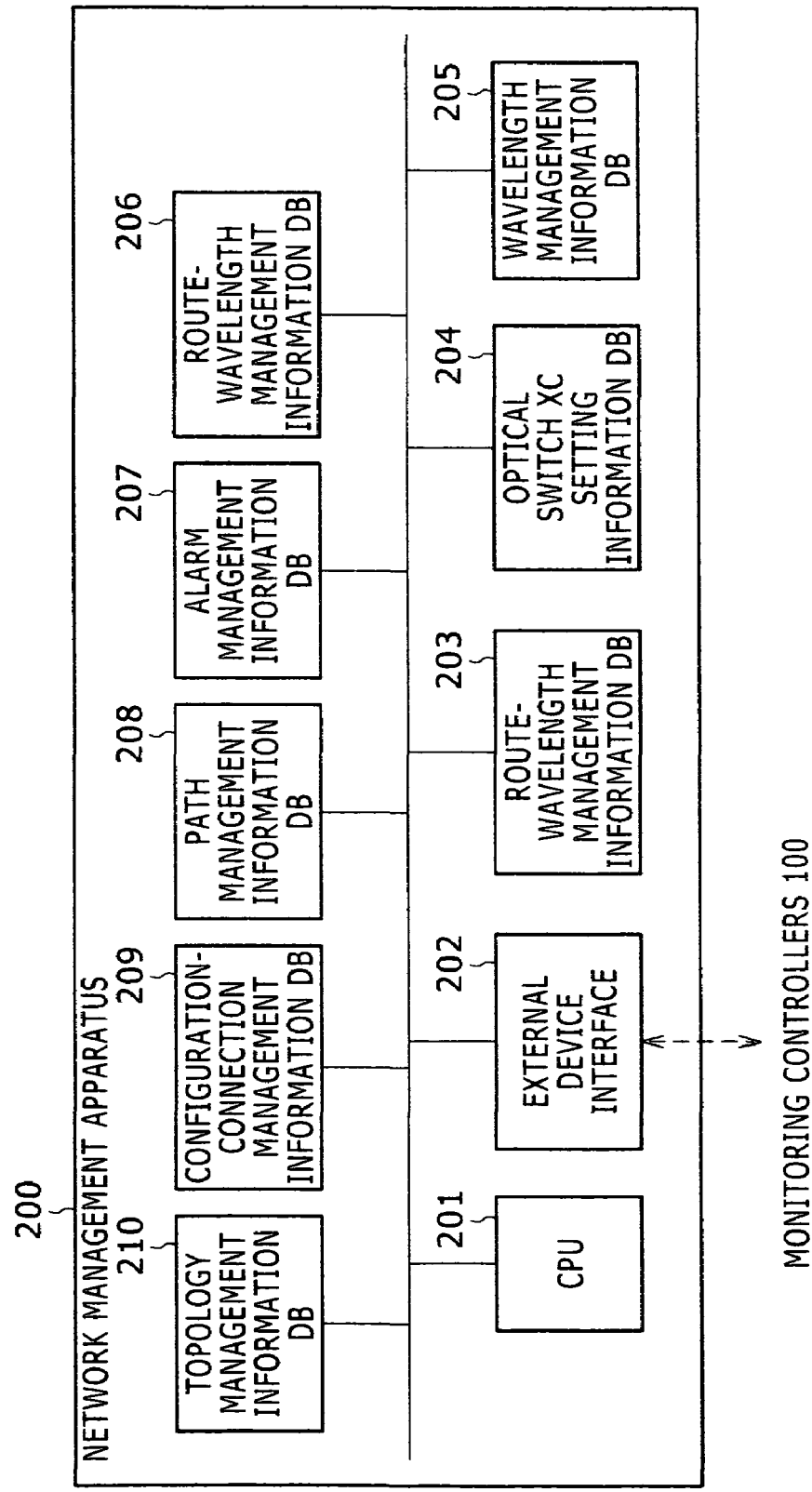
FIG. 5 is a block diagram illustrating the detailed configuration of a network management apparatus of the optical crossconnect apparatus.

The network management apparatus 200 shown in FIG. 5 includes: a CPU 201; an external device interface 202 having an interface for communication with the monitoring controller 100 of the optical crossconnect apparatus 11; a topology management information DB 210 for managing the network topology of the optical crossconnect apparatus 11; a configuration-connection management information DB 209 for collecting and managing plural configuration-connection management information DBs 102 of the optical crossconnect apparatuses 11; an alarm management information DB 207 for collecting and managing plural alarm management information DBs 105 of the optical crossconnect apparatuses 11; an optical switch crossconnect setting information DB 204 for collecting and managing plural optical switch crossconnect setting information DBs 106 of the optical crossconnect apparatuses 11; a wavelength management information DB 205 for collecting and managing plural wavelength management information DBs 107 of the optical crossconnect apparatuses 11; a path management information DB 208 for managing the information on the start and destination nodes of a path, together with the information of the optical switch crossconnect setting information DB 204 and the information of the wavelength management information DB 205, relating to the routes and wavelengths of the path; a topology management information DB 210; a route-wavelength calculation section 206 for calculating the routes and used wavelengths of the working path and backup path, based on the configuration-connection management information DB 209 and the alarm management information DB 207 as well as the path management information; and a route-wavelength management information DB 203 for storing the calculation results of the route-wavelength calculation section 206.

Figure 6:
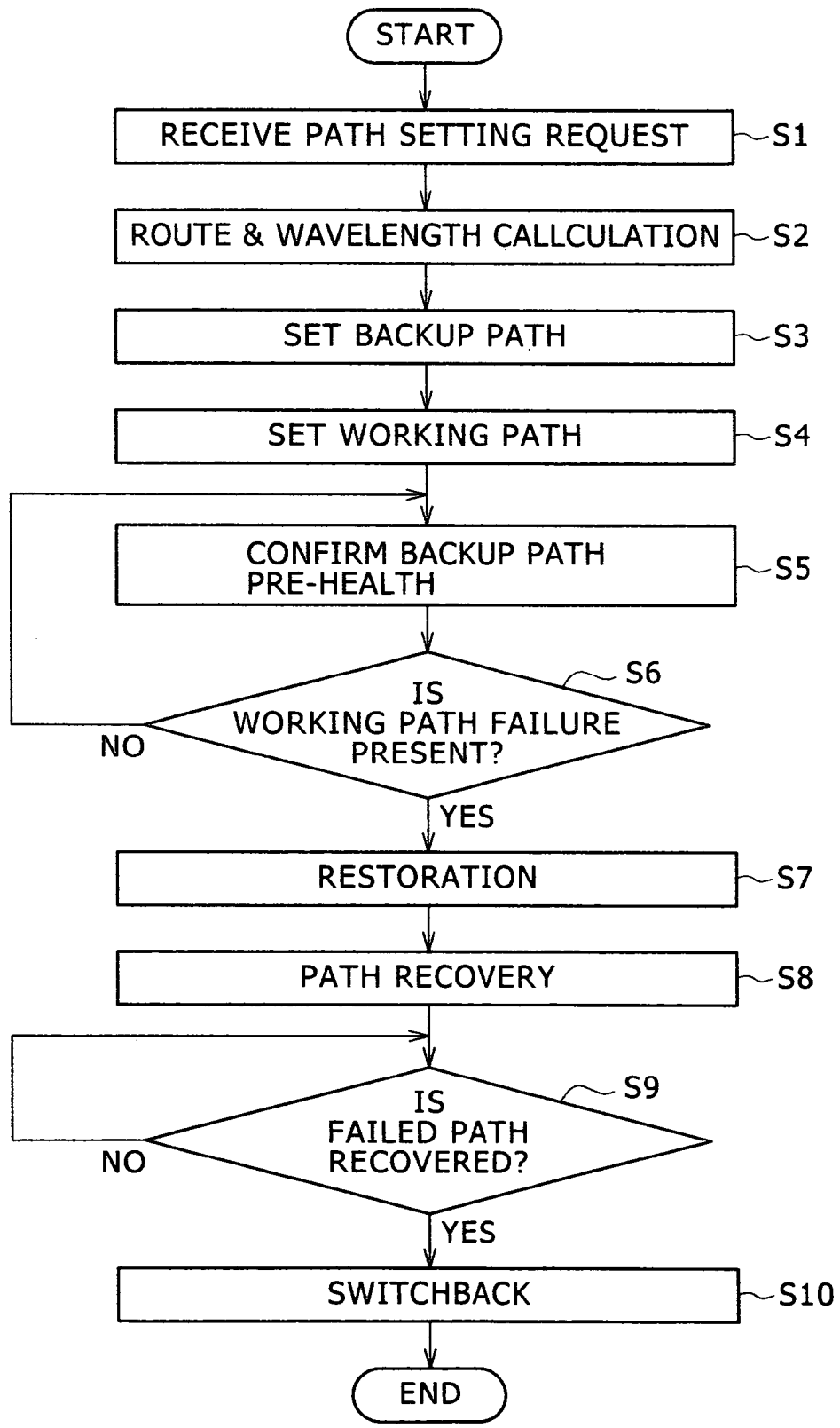
FIG. 6 is an operation flowchart of the optical crossconnect apparatus and the network management apparatus.

The operation of the optical crossconnect apparatus 11 and the network management apparatus 200 will be outlined with reference to the operation flowchart shown in FIG. 6. The network management apparatus 200 receives a path setting request (S1), calculates the route and used wavelength of the working path and also calculates the route and used wavelength of the backup path (S2). Based on the results of the above-described calculation, the optical crossconnect apparatus 11 sets the backup path (S3), and sets the working path (S4). Thus, the paths are opened. After the opening of the paths, the optical crossconnect apparatus 11 periodically performs a pre-health confirmation of the backup path (S5). In the case where a failure occurs in the working path (S6), the optical crossconnect apparatus 11 performs restoration (S7) so as to recover the working path (S8). The crossconnect apparatus 11 starts monitoring the failed part (S9). When recognizing that the failed part is recovered from the failure, the optical crossconnect apparatus 11 performs switchback (S10), and then ends the flow.

Figure 7:
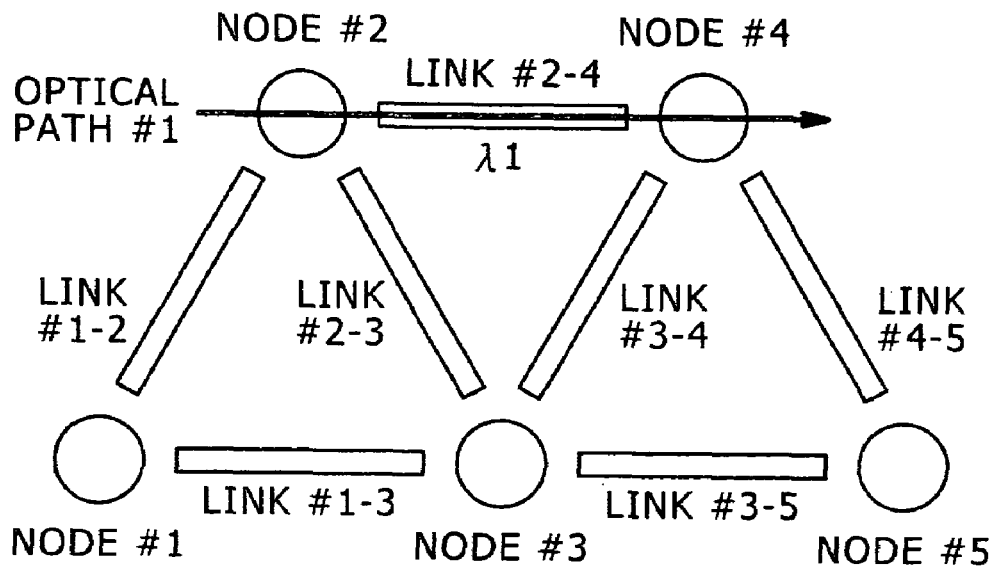
FIG. 7 is a view illustrating the route of an optical path in the normal condition.
Figure 8:
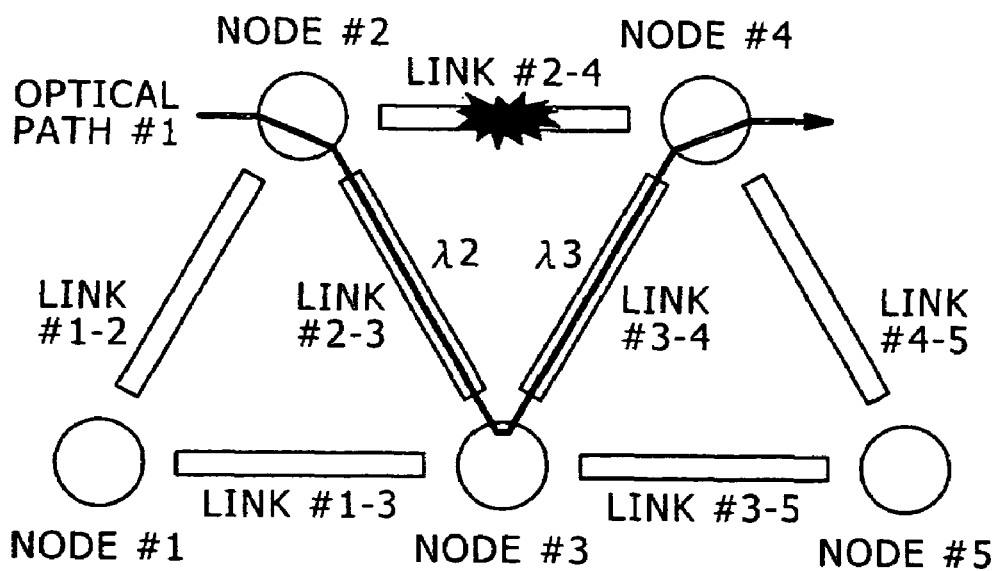
FIG. 8 is a view illustrating the route of the optical path when a link failure occurs.

An application of the optical crossconnect apparatus 11 will be described with reference to the network of FIGS. 7 and 8. In FIG. 7, there is shown Path #1 of Wavelength λ1 extending from Node #2 to Node #4 through Link #2-4. Upon occurrence of a link failure in Link #2-4, Node #1 performs restoration by bypassing to the route through Node #3, as shown in FIG. 8, using a backup path of Wavelength λ2 extending from Node #2 to Node #3 through Link #2-3 and a backup path of Wavelength λ3 extending from Node #3 to Node #4 through Link #3-4. Hereinafter, the description will be made on a working path setting procedure, a backup path setting procedure, a procedure of backup path pre-health confirmation, a restoration procedure, and a switchback procedure of Path #1 in this order.

(Working Path Setting)

The working path setting will be described with reference to FIG. 9. Incidentally, in order to simplify the drawings, the multiplexers and demultiplexers are not shown in FIG. 9 and also in FIGS. 14 and 16 that will be described below. The working path setting is done by crossconnect settings XC2-1, XC2-2 and a wavelength setting C2-1 (Wavelength λ1) of Node #2, and by crossconnect settings XC4-1, XC4-2 and a wavelength setting C4-1 (Wavelength λ1) of Node #4.

(Backup Path Setting)

The backup path setting will be described with reference to FIG. 9. In FIG. 9, the backup path setting is done by a crossconnect setting XC2-11 of Node #2, crossconnect settings XC3-11 and XC 3-12 of Node #3, and a crossconnect setting XC4-11 of Node #4. Herein, there are not set a crossconnect setting XC2-21 and a wavelength setting C2-11 of Node #2, crossconnect settings XC3-21, XC3-22 and wavelength settings C3-11, C3-21 of Node #3, and a crossconnect setting XC4-21 and a wavelength setting C4-21 of Node #4, except in the cases of the backup path pre-health confirmation and restoration. This is because the wavelength tunable transmitter 51 of the wavelength tunable repeater 50 used for the backup path is shared by plural backup paths.

Figure 9:
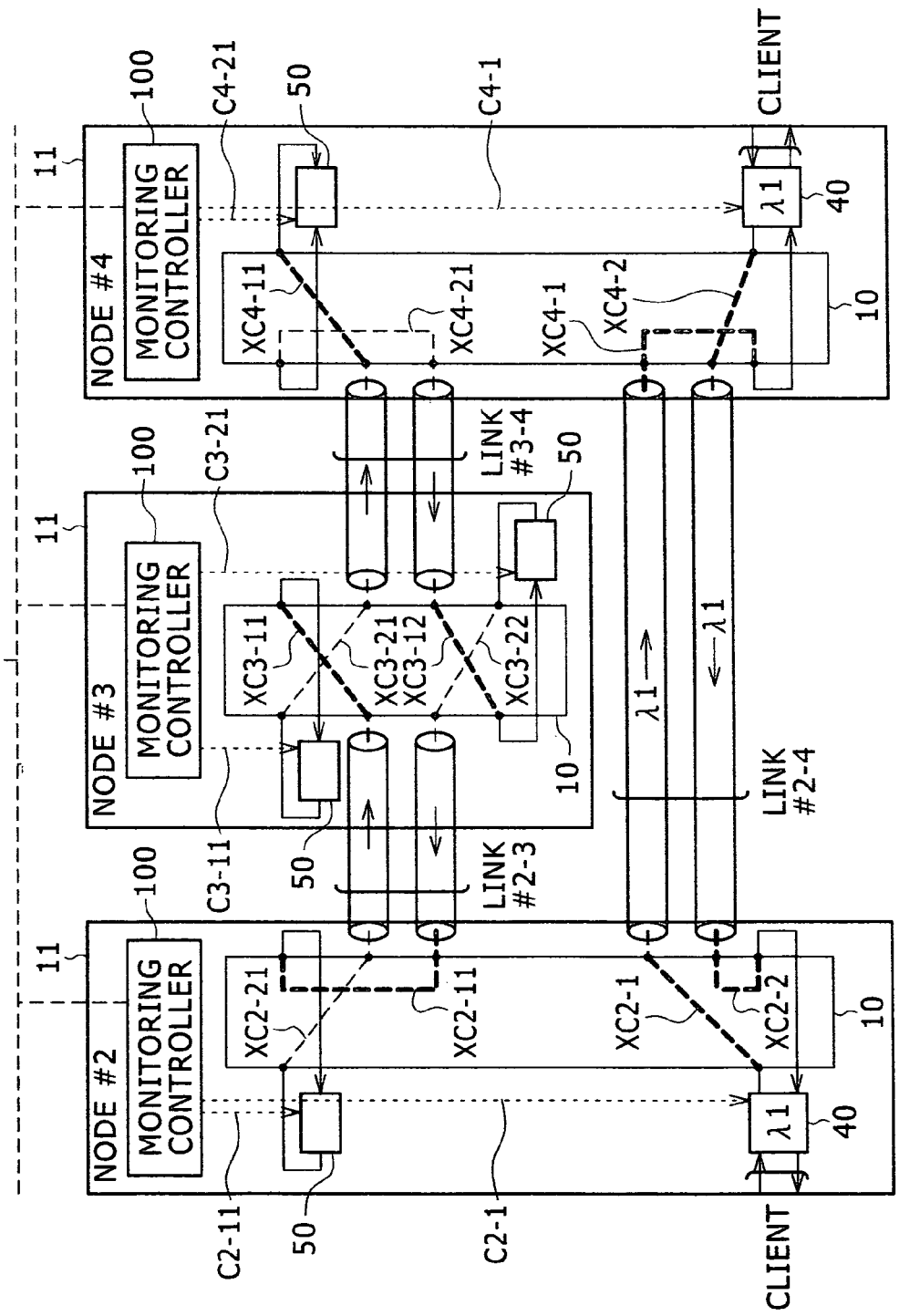
FIG. 9 is a block diagram illustrating an operation of the optical crossconnect apparatus.

In FIG. 9, the fixed crossconnect setting of the backup path is indicated by the bold dashed line. The setting shared by plural backup paths is indicated by the thin dashed line. As apparent from FIG. 9, the crossconnect of the optical switch 10 in the reception side of the wavelength tunable repeater 50 is fixed, while the crossconnect of the optical switch 10 in the transmission side is shared. The transmission wavelength of the wavelength tunable repeater 50 varies among the plurality of backup paths. In this manner, the crossconnect of the optical switch 10 in the reception side of the wavelength tunable repeater 50 is fixed to make it possible to receive in-channel control signals.

(Backup Path Pre-Health Confirmation)

Figure 10:
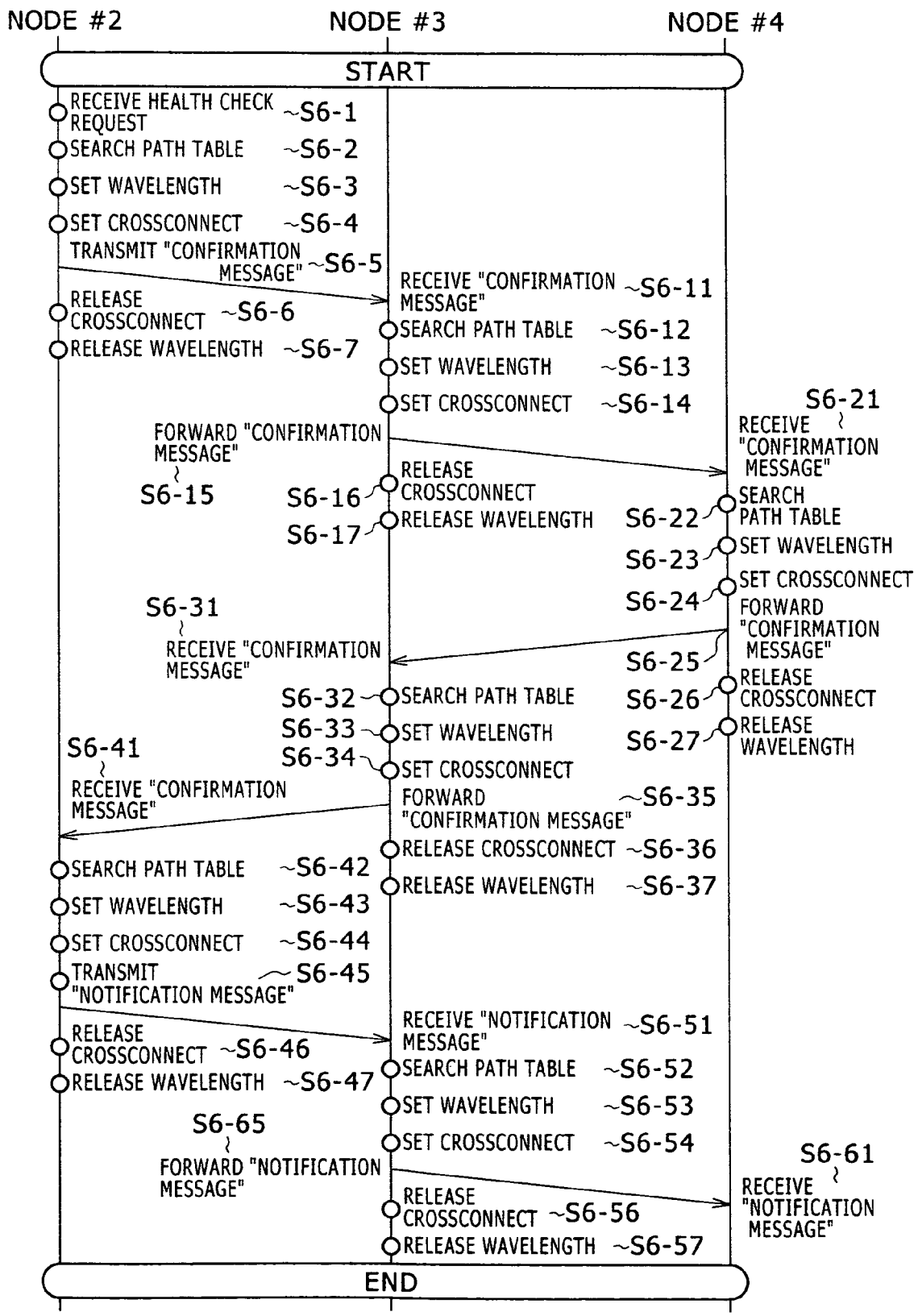
FIG. 10 is a sequence diagram illustrating an operation of a backup path pre-health confirmation.

The method of the backup path pre-health confirmation will be described with reference to FIGS. 9 to 12. Herein, FIG. 10 is a sequence diagram illustrating an operation of the backup path pre-health confirmation. FIGS. 11A to 11C are diagrams showing path tables stored in the route-wavelength management information DBs of the respective nodes. FIG. 12 is a view illustrating the time allocation for the backup path pre-health confirmation. Incidentally, in relation to Path #1, Node #2 will be referred to as a source node, Node #4 as an destination node, and Node #3 as a intermediate node, respectively.

In FIG. 10, upon reception of a health confirmation request (which will be described below with reference to FIG. 12) from the network management apparatus 200 (S6-1), the source node (Node #2) determines the fiber and wavelength of the next emission destination from the output column of the information table (T2-1 in FIG. 11A) (S6-2). The monitoring controller 100 of the source node sets the wavelength (C2-11 in FIG. 9) of the wavelength tunable repeater 50 to the value (λ2) of the table (S6-3), and sets the crossconnect setting (XC2-21 in FIG. 9) of the optical switch 10 to the values (Link #2-3, λ2 in FIG. 11A) (S6-4). The monitoring controller 100 controls the overhead processor 45 of the wavelength tunable repeater 50, and emits a "confirmation message (in-channel control signal)" to the intermediate node (Node #3) (S6-5). Herein, the monitoring controller 100 releases the crossconnect setting (XC2-21) (S6-6), and also releases the wavelength setting (C2-11) (S6-7).

When the overhead processor 45 of the wavelength tunable repeater 50 receives the "confirmation message" (S6-11), the intermediate node (Node #3) determines the forwarding destination from the output column of the information table (T3-1 in FIG. 11B) (S6-12). The monitoring controller 100 of the intermediate node sets the wavelength (C3-11 in FIG. 9C) of the wavelength tunable repeater 50 to the value (λ3) of the table (S6-13), sets the crossconnect setting (XC3-21) of the optical switch 10 to the values (Link #3-4, λ3 in FIG. 11B) of the table (S6-14), and forwards the "confirmation message" to the destination node (Node #4) (S6-15). The monitoring controller 100 releases the crossconnect setting (XC3-21) (S6-16), and also releases the wavelength setting (C3-11) (S6-17).

Similarly, the destination node (Node #4) receives the "confirmation message" (S6-21), and determines the forwarding destination from the output column of the information table (T4-1 in FIG. 1C) (S6-22). The monitoring controller 100 of the destination node sets the wavelength (C4-21) of the wavelength tunable repeater 50 to the value (λ3) of the table (S6-23), sets the crossconnect setting (XC4-21) of the optical switch 10 to the values (Link #3-4, λ3) of the table (S6-24), and forwards the "confirmation message" to the intermediate node (Node #3) (S6-25). The monitoring controller 100 releases the crossconnect setting (XC4-21) (S6-26), and also releases the wavelength setting (C4-21) (S6-27).

Similarly, the intermediate node (Node #3) receives the "confirmation message" (S6-31), and determines the forwarding destination from the output column of the information table (T3-2 in FIG. 11B) (S6-32). The monitoring controller 100 of the intermediate node sets the wavelength (C3-21) of the wavelength tunable repeater 50 to the value (λ2) of the table (S6-33), sets the crossconnect setting (XC3-22) of the optical switch 10 to the values (Link #2-3, λ2) of the table (S6-34), and forwards the "confirmation message" to the source node (Node #2) (S6-35). The monitoring controller 100 of the intermediate node releases the crossconnect setting (XC3-22) (S6-36), and also releases the wavelength setting (C3-21) (S6-37).

The source node (Node #2) receives the "confirmation message" (S6-41), and recognizes health of the backup path. Further, in order to notify the intermediate node (Node #3) and the destination node (Node #4) about this information, the source node emits a "notification message (in-channel control signal)" in the same way as the "confirmation message".

The source node (Node #2) determines the fiber to which the "notification message" is emitted and its wavelength from the output column of the information table (T2-1) (S6-42). The monitoring controller 100 sets the wavelength (C2-11) of the wavelength tunable repeater 50 to the value (λ2) of the table (S6-43), sets the crossconnect setting (XC2-21) of the optical switch 10 to the values (Link #2-3, λ2) of the table (S6-44), and emits the "notification message" to the intermediate node (Node #3) (S6-45). The monitoring controller 100 releases the crossconnect setting (XC2-21) (S6-46), and also releases the wavelength setting (C2-11) (S6-47).

The intermediate node (Node #3) receives the "notification message" (S6-51), and then determines the next forwarding destination from the output column of the information table (T3-1) (S6-52). The monitoring controller 100 sets the wavelength (C3-11) of the wavelength tunable repeater 50 to the value (λ3) of the table (S6-53), sets the crossconnect setting (XC3-21) of the optical switch 10 to the values (Link #3-4, λ3) of the table (S6-54), and forwards the "notification message" to the destination node (Node #4) (S6-55). The monitoring controller 100 releases the crossconnect setting (XC3-21) (S6-56), and also releases the wavelength setting (C3-11) (S6-57).

The destination node (Node #4) receives the "notification message" through the intermediate node (Node #3) (S6-61), and thereby obtains the information on the backup path health.

The request of the backup path pre-health confirmation is issued by the network management apparatus. The timing of issuing the request of the backup path pre-health confirmation is provided based on the time allocation as shown in FIG. 12. Assuming that the number of backup paths used for partial relief of the working path is up to N and the confirmation cycle of the backup paths is T seconds for the assumed network failure, the time allocated to one backup path is T/N. Incidentally, the values of T and N are selected so that the value of T/N exceeds the time required from START to END shown in FIG. 10. The reason why the time allocation is made is to avoid competition in the wavelength tunable repeater, which may possibly occur when the pre-heath confirmation of plural backup paths is started at the same timing.

(Restoration)

Figure 14:
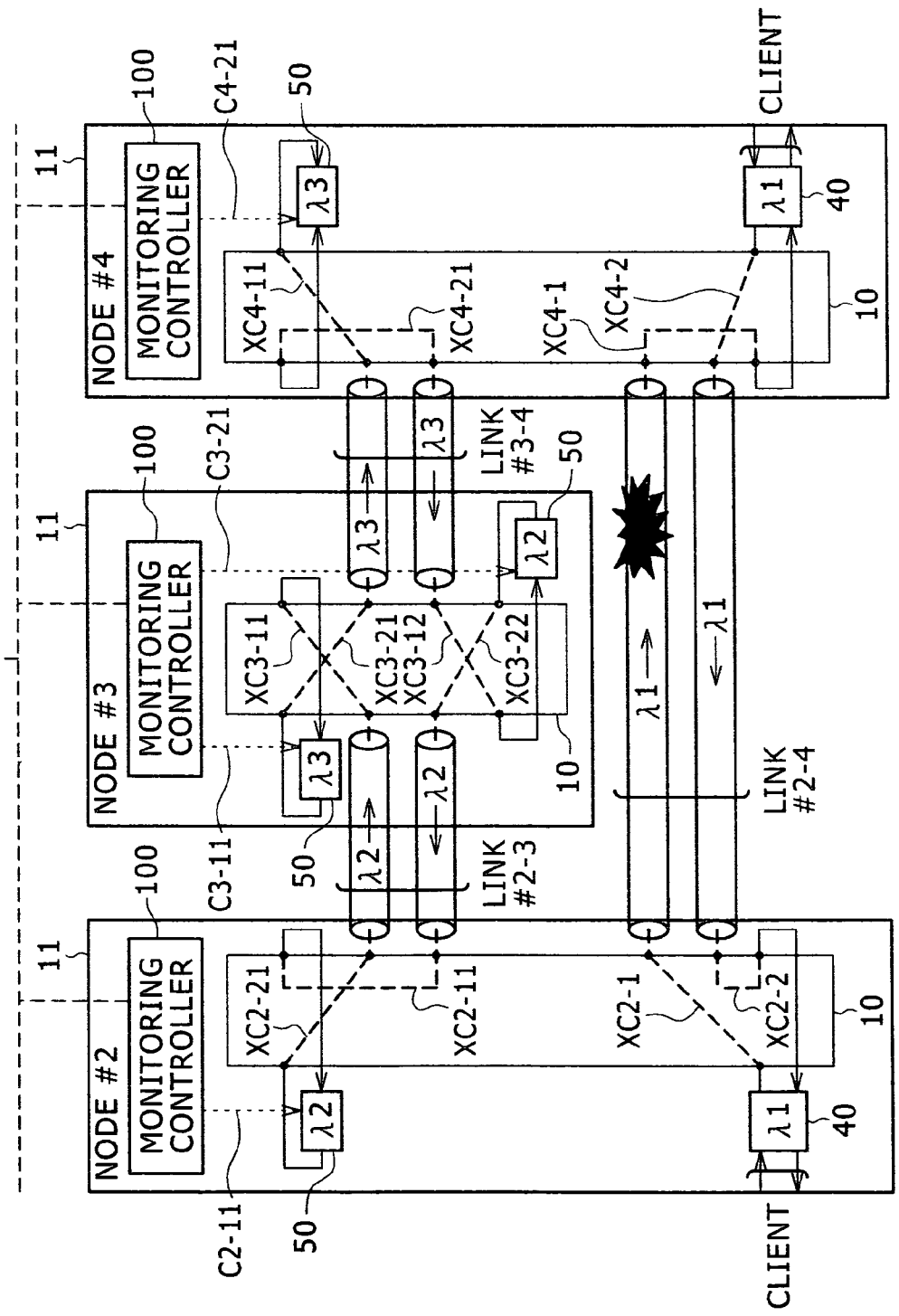
FIG. 14 is a block diagram illustrating an operation of the optical crossconnect apparatus.
Figure 16:
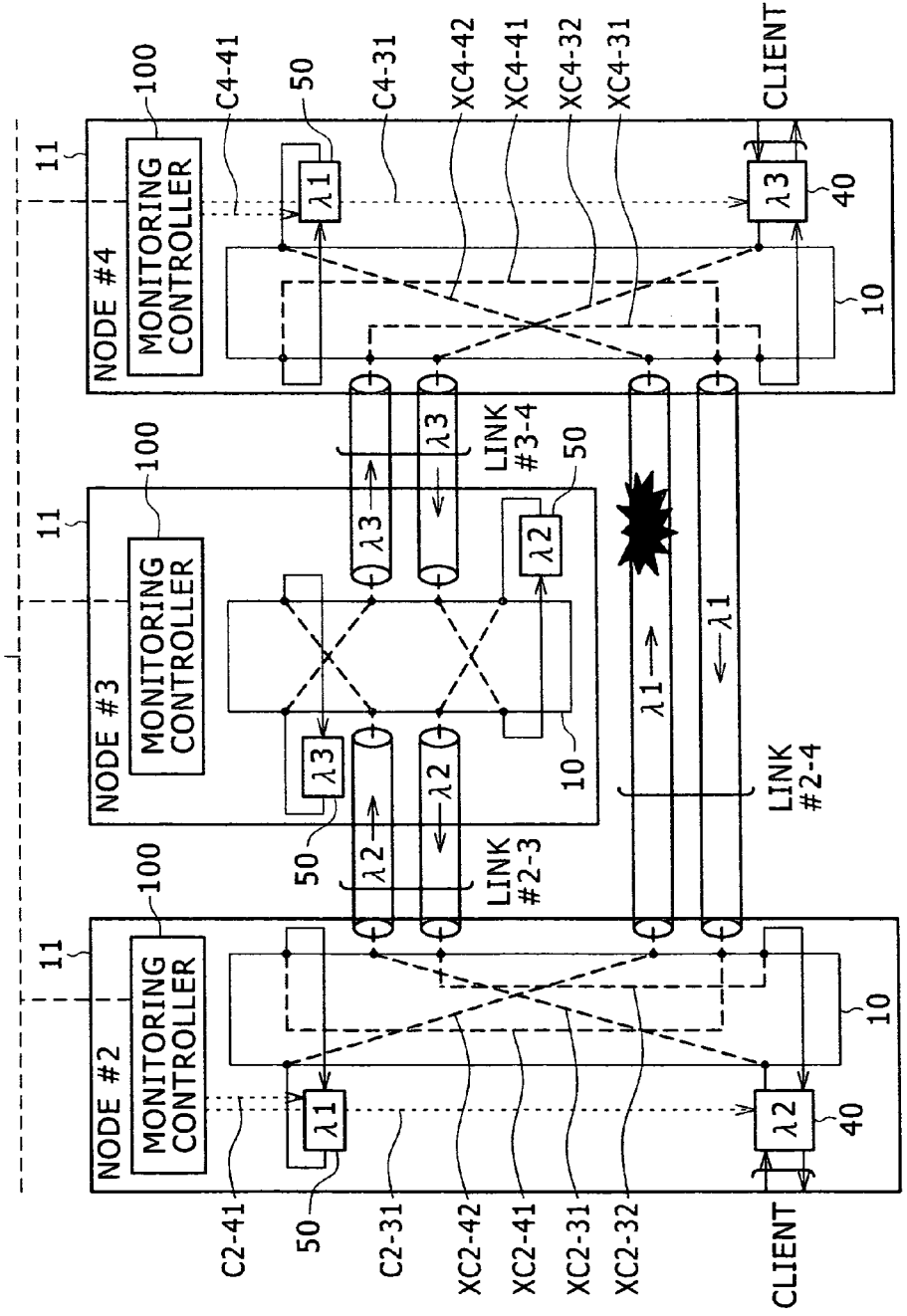
FIG. 16 is a block diagram illustrating an operation of the optical crossconnect apparatus.

The restoration of Optical Path #1 shown in FIG. 8 will be described with reference to FIGS. 13 to 17A and 17B. Herein, FIG. 13 is a sequence diagram illustrating a restoration operation. FIG. 14 and FIG. 16 are block diagrams each illustrating an operation of the optical crossconnect apparatus. FIGS. 15A to 15C are diagrams showing path tables (bandwidth reservation) stored in the route-wavelength management information DBs 104 of the respective nodes. FIG. 16 is a view illustrating an operation of the optical crossconnect apparatus. FIG. 17 is a diagram showing path tables (exchange) stored in the route-wavelength management information of the respective nodes.

In FIG. 13, upon detection of a failure in the wavelength tunable transponder 40 (S8-1), the monitoring controller 100 of the destination node (Node #4) determines the output fiber of the backup path to be the emission destination and its wavelength channel from the output column of the information table (T4-1 in FIG. 15C) (S8-2). The monitoring controller 100 sets the wavelength (C4-21 in FIG. 14) of the wavelength tunable repeater 50 to the value (λ3) of the table (S8-3), sets the crossconnect setting (XC4-21) of the optical switch 10 to the values (Link #3-4, λ3) of the table (S8-4), and emits a "bandwidth reservation request (in-channel control signal)" to the intermediate node (Node #3) (S8-5).

The intermediate node (Node #3) receives the "bandwidth reservation request" (S8-11). The monitoring controller 100 determines the forwarding destination from the output column of the information table (T3-2 in FIG. 15B) (S8-12). Then, the monitoring controller 100 sets the wavelength (C3-21) of the wavelength tunable repeater 50 to the value (λ2) of the table (S8-13), sets the crossconnect setting (XC3-11) of the optical switch 10 to the values (Link #2-3, λ2) of the table (S8-14), and forwards the "bandwidth reservation request" to the source node (Node #2) (S8-15).

The source node (Node #2) receives the "bandwidth reservation request" (S8-21). The monitoring controller 100 determines the forwarding destination from the output column of the information table (T2-1 in FIG. 15A) (S8-22). Then, the monitoring controller 100 sets the wavelength (C2-11 in FIG. 14) of the wavelength tunable repeater 50 to the value (λ2) of the table (S8-23), sets the crossconnect setting (XC2-21) of the optical switch 10 to the values (Link #2-3, λ2) of the table (S8-24), and forwards the "bandwidth reservation request" to the intermediate node (Node #3) (S8-25). The intermediate node (Node #3) receives the "bandwidth reservation request" (S8-31). The monitoring controller 100 determines the forwarding destination from the output column of the information table (T3-1) (S8-32). Then, the monitoring controller 100 sets the wavelength (C3-11) of the wavelength tunable repeater 50 to the value (λ3) of the table (S8-33), sets the crossconnect setting (XC3-21) of the optical switch 10 to the values (Link #2-3, λ2) of the table (S8-34), and forwards the "bandwidth reservation request" to the destination node (Node #4) (S8-35).

The destination node (Node #4) receives the "bandwidth reservation request" (S8-41). The monitoring controller 100 emits an "exchange request (in-channel control signal)" in order to exchange the backup path for which the bandwidth is reserved, with the failed part of the working path (S8-42). The intermediate node (Node #3) receives the "exchange request" and forwards the request to the source node (Node #2) (S8-51).

Upon reception of the "exchange request" (S8-61), the source node (Node #2) forwards the "exchange request" (S8-62), and determines the route table for the failure of Link #2-4, from the failure column of the exchange table (T2-11) (S8-63). Then, the source node exchanges the wavelength between the wavelength tunable repeater 50 and the wavelength tunable transponder 40, namely, the former is set to λ1 and the latter to λ2 (S8-64), and exchanges the target fiber and the wavelength channel between the wavelength tunable repeater 50 and the wavelength tunable transponder 40, namely, the former is set to Link #2-4 with λ1 channel and the latter to Link #2-3 with λ2 channel (S8-65). The intermediate node (Node #3) receives the "exchange request" and forwards the request to the destination node (Node #4) (S8-71).

The destination node (Node #4) receives the "exchange request" (S8-81), and determines the route table for the failure of Link #2-4, from the failure column of the exchange table (T4-11) (S8-82). The destination node exchanges the wavelengths of the wavelength tunable repeater 50 and the wavelength tunable transponder 40, namely, the former is set to λ1 and the latter to λ3 (S8-83), and exchanges the target fibers and their wavelength channels of the wavelength tunable repeater 50 and the wavelength tunable transponder 40, namely, the former is set to Link #2-4 with λ1 channel and the latter to Link #3-4 with λ3 channel (S8-84). Then, the destination node notifies the network management apparatus about the end of the exchange operation (S8-85), and ends the sequence.

The description will be made, with reference to FIG. 16, on the optical switch setting, together with the transmission wavelengths of the wavelength tunable transponder and the wavelength tunable repeater, for each node after completion of the restoration. The wavelength tunable transponder 40 of Node #2 converts the optical signal from the client to Wavelength λ2. The optical signal of Wavelength λ2 is received in the wavelength tunable repeater 50 of Node #3 through Link #2-3 by means of the optical switch 10. The wavelength tunable repeater 50 of Node #3 converts the received optical signal of Wavelength λ2 to Wavelength λ3. The optical signal of Wavelength λ3 is received in the wavelength tunable transponder 40 of Node #4 by means of the optical switch 10 through Link #2-3. The wavelength tunable transponder 40 of Node #4 forwards the received optical signal to the client.

On the other hand, the wavelength tunable repeater 50 of Node #2 sets the transmission wavelength to λ1. The optical switch 10 of Node #2 connects the optical signal of Wavelength λ1 from the wavelength tunable repeater 50 to Link #2-4. The optical switch 10 of Node #4 connects Link #2-4 and the wavelength tunable repeater 50. Then, the wavelength tunable repeater 50 monitors the optical signals from Link #2-4. This makes it possible to monitor failure recovery of Link #2-4 where the failure has occurred.

Incidentally, recovery monitoring of the failed part in the working path can be performed in the same manner as the backup path health confirmation, because the output wavelength and target link of the wavelength tunable repeater are exchanged.

(Switchback)

The switchback method will be described with reference to FIGS. 18, 11A to 1C, and 17A and 17B. Herein, FIG. 18 is a sequence diagram illustrating a switchback operation.

Figure 18:
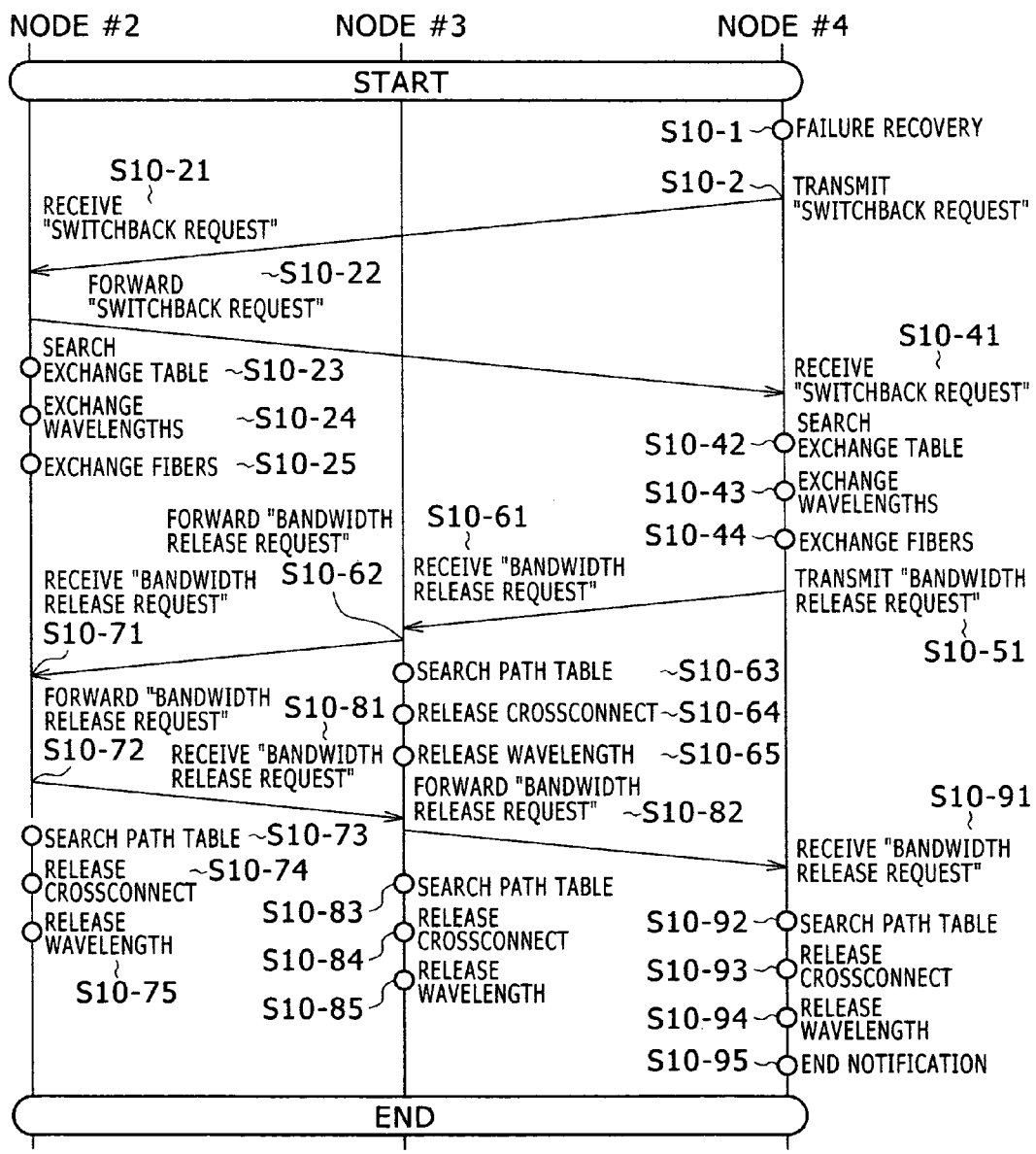
FIG. 18 is a sequence diagram illustrating a switchback operation.

In FIG. 18, the destination node (Node #4) detects failure recovery of Link #2-4 by the wavelength tunable repeater 50 (S10-21). The monitoring controller 100 emits a "switchback request (in-channel control signal)" to the source node (Node #2) in order to perform switchback (S10-2). The source node (Node #2) receives the "switchback request" by the wavelength tunable repeater 50 (S10-21), and forwards the "switchback request" to the destination node (Node #4) (S10-22). Next, the monitoring controller 100 determines the appropriate connection that Link #2-4 should have in the normal condition from the path table (exchange) (T2-11) of FIGS. 17A and 17B (S10-23), and exchanges the wavelengths currently set to the wavelength tunable repeater 50 and the wavelength tunable transponder 40 to return them to the original settings. More specifically, the former is set to λ2 and the latter to λ1 (S10-24). The monitoring controller 100 exchanges the target fibers and their wavelength channels of the wavelength tunable repeater 50 and the wavelength tunable transponder 40 to return them to the original settings, namely, the former is set to Link #2-3 with λ2 channel and the latter to Link #2-4 with λ1 channel (S10-25).

The destination node (Node #4) receives the "switchback request" (S10-41). The monitoring controller 100 determines the appropriate connection that Link #2-4 should have in the normal condition from the path table (exchange) (T4-11) of FIG. 17 (S10-42), and exchanges the wavelengths currently set to the wavelength tunable repeater 50 and the wavelength tunable transponder 40 to return them to the original settings, namely, the former is set to λ3 and the latter to λ1 (S10-43). The monitoring controller 100 exchanges the target fibers and their wavelength channels of the wavelength tunable repeater 50 and the wavelength tunable transponder 40, namely, the former is set to Link #3-4 with λ3 channel and the latter to Link #2-4 with λ1 channel (S10-44). Further, the destination node (Node #4) emits a "bandwidth release request (in-channel control signal)" to the intermediate node (Node #3) (S10-51).

The intermediate node (Node #3) receives the "bandwidth release request" by the wavelength tunable repeater 50 (S10-61), and forwards the "bandwidth release request" to Node #2 (S10-62). Next, the monitoring controller 100 determines the content to be released, from the output column of the path table (T3-2) of FIG. 11 (S10-63), releases the value (XC3-22) currently setting the crossconnect of the optical switch 10, and also releases the wavelength setting value (λ2, C3-21) of the wavelength tunable repeater 50 (S10-65).

The source node (Node #2) receives the "bandwidth release request" by the wavelength tunable repeater 50 (S10-71). The monitoring controller 100 forwards the "bandwidth release request" to the intermediate node (Node #3) (S10-72). The monitoring controller 100 determines the content to be released, from the output column of the information table (T2-1) (S10-73), releases the value (XC2-21) currently setting the crossconnect of the optical switch 10 (S10-74), and also releases the wavelength setting value (λ2, C2-11) of the wavelength tunable repeater 50 (S10-75).

The intermediate node (Node #3) receives the "bandwidth release request" by the wavelength tunable repeater 50 (S10-81). The monitoring controller 100 forwards the "bandwidth release request" to the destination node (Node #4) (S10-82). The monitoring controller 100 determines the content to be released, from the output column of the information table (T3-1) (S10-83), releases the value (XC3-21) currently setting the crossconnect of the optical switch 10, and also releases the wavelength setting value (λ2, C3-11) of the wavelength tunable repeater 50 (S10-85).

The destination node (Node #4) receives the "bandwidth release request" by the wavelength tunable repeater 50 (S10-91). The monitoring controller 100 determines the content to be released, from the output column of the information table (T4-1) (S10-92), releases the value (XC4-21) currently setting the crossconnect of the optical switch 10 (S10-93), and also releases the wavelength setting value (λ3, C4-21) of the wavelength tunable repeater 50 (S10-94), and then ends the bandwidth release of the backup paths. Further, the destination node (Node #4) notifies the network management apparatus about the end of the switchback operation (S10-95), and then ends the switchback sequence.

According to the exemplary embodiment, it is possible to transmit and receive the in-channel control signals by connecting the tunable wavelength conversion repeater and the multiplexer in the side of the bypass route, when needed. Further, according to the exemplary embodiment, the above-described connection is made in the start of the transmission of the in-channel control signal and is released after completion of the transmission, so that the tunable wavelength conversion repeater can be shared with failure-independent backup paths. In addition, when a failure occurs in the working path, it is possible to recover the path from failure and monitor the restoration of the failed part in the working path, by exchanging the output wavelengths and target links of the wavelength tunable transponder and the wavelength tunable repeater, after the alternate link has been reserved.

According to the present invention, it is possible to provide an optical crossconnect apparatus capable of transmitting and receiving in-channel control signals through the OEO conversion once per node, by connecting the tunable wavelength conversion repeater and the multiplexer in the side of the bypath route when needed.

We claim:

1. An optical crossconnect apparatus comprising:
   a demultiplexer for demultiplexing a wavelength multiplexed optical signal from a first transmission line;
   a plurality of wavelength tunable transponders for transmitting and receiving an optical signal with a client, wherein the wavelength of the optical signal to be transmitted to an optical switch is tunable;
   a plurality of wavelength tunable repeaters for extracting and forwarding an in-channel monitoring control signal, wherein the wavelength of the optical signal to be transmitted to said optical switch is tunable;
   a multiplexer for wavelength-multiplexing the optical signal and transmitting the multiplexed signal to a second transmission line;
   said optical switch having the output of said demultiplexer and said transponder and said wavelength tunable repeater as an input, and having the input of said multiplexer and said transponder and said wavelength tunable repeater as an output; and
   a monitoring controller for transmitting and receiving the in-channel control signal with said wavelength tunable transponder and said wavelength tunable repeater, controlling transmission wavelengths of wavelength tunable transmitters of said wavelength tunable transponder and said wavelength tunable repeater, and controlling connection of said optical switch.

2. The optical crossconnect apparatus according to claim 1, wherein said wavelength tunable repeater includes:
   an optical receiver for receiving the optical signal from the optical switch and converting to an electric signal;
   an overhead processor for providing overhead processing for the electric signal from the optical receiver; and
   a wavelength tunable optical transmitter for converting the electric signal from the overhead processor to an optical signal having a arbitrary wavelength depending upon control of the monitoring controller, and transmitting the optical signal to the optical switch.

3. An optical crossconnect apparatus comprising:
   a demultiplexer for demultiplexing a wavelength multiplexed optical signal from a first transmission line;
   a plurality of wavelength tunable repeaters for extracting and forwarding an in-channel monitoring control signal;
   a multiplexer for wavelength-multiplexing the optical signal and transmitting the multiplexed signal to a second transmission line;
   an optical switch having the output of said demultiplexer and said wavelength tunable repeaters as an input, and having the input of said multiplexer and said wavelength tunable repeaters as an output;
   a monitoring controller for transmitting and receiving the in-channel control signal with said wavelength tunable repeaters, controlling transmission wavelengths of wavelength tunable transmitters of said wavelength tunable repeaters, and controlling connection of said optical switch,
   wherein a plurality of inputs of said optical switch to which said plurality of wavelength tunable repeaters are connected are connected to one output of said optical switch in a time division manner.

4. The optical crossconnect apparatus according to claim 3, wherein the transmission wavelength of said wavelength tunable repeater is changed in synchronizing with said time division.

5. The optical crossconnect apparatus according to claim 3, wherein said wavelength tunable repeater includes:
   an optical receiver for receiving the optical signal from the optical switch and converting to an electric signal;
   an overhead processor for providing overhead processing for the electric signal from the optical receiver; and
   a wavelength tunable optical transmitter for converting the electric signal from the overhead processor to an optical signal having a arbitrary wavelength depending upon control of the monitoring controller, and transmitting the optical signal to the optical switch.

6. An optical crossconnect apparatus comprising:
   an optical switch;
   a wavelength tunable transponder for accommodating a client signal;
   a wavelength tunable repeater; and
   a monitoring controller for performing crossconnect control of said optical switch, transmission wavelength control between said transponder and said wavelength tunable repeater, and transmission and reception of an in-channel control signal,
   wherein in a switch back operation, said optical crossconnect apparatus exchanges transmission wavelengths and targets of said optical switch between said wavelength tunable transponder and said wavelength tunable repeater.

7. The optical crossconnect apparatus according to claim 6, wherein said wavelength tunable repeater includes:
- an optical receiver for receiving the optical signal from the optical switch and converting to an electric signal;
- an overhead processor for providing overhead processing for the electric signal from the optical receiver; and
- a wavelength tunable optical transmitter for converting the electric signal from the overhead processor to an optical signal having a arbitrary wavelength depending upon control of the monitoring controller, and transmitting the optical signal to the optical switch.

8. The optical crossconnect apparatus according to claim 6, wherein said apparatus confirms the health of non-working paths by transmitting and receiving said in-channel control signal.

9. An optical crossconnect apparatus comprising:
- a demultiplexer for demultiplexing a wavelength multiplexed optical signal from a first transmission line;
- a plurality of wavelength tunable repeaters for extracting and forwarding an in-channel monitoring control signal;
- a multiplexer for wavelength-multiplexing the optical signal and transmitting the multiplexed signal to a second transmission line;
- an optical switch having the output of said demultiplexer and said wavelength tunable repeater as an input, and having the input of said multiplexer and said wavelength tunable repeater as an output; and
- a monitoring controller for transmitting and receiving the in-channel control signal with said wavelength tunable repeater, controlling transmission wavelength of a wavelength tunable transmitter of said wavelength tunable repeater, and controlling connection of said optical switch,
- wherein the input of said optical switch to which said wavelength tunable repeater is connected is connected to a plurality of outputs of said optical switch in a time division manner.

10. The optical crossconnect apparatus according to claim 9, wherein the transmission wavelengths of said wavelength tunable repeater is changed when synchronizing with said time division.

11. The optical crossconnect apparatus according to claim 9, wherein said wavelength tunable repeater includes:
- an optical receiver for receiving the optical signal from the optical switch and converting to an electric signal;
- an overhead processor for providing overhead processing for the electric signal from the optical receiver; and
- a wavelength tunable optical transmitter for converting the electric signal from the overhead processor to an optical signal having a arbitrary wavelength depending upon control of the monitoring controller, and transmitting the optical signal to the optical switch.

12. An optical crossconnect apparatus comprising:
- an optical switch;
- a wavelength tunable transponder for accommodating a client signal;
- a wavelength tunable repeater; and
- a monitoring controller for performing crossconnect control of said optical switch, transmission wavelength control between said transponder and said wavelength tunable repeater, and transmission and reception of an in-channel control signal,
- wherein upon occurrence of a failure, the optical crossconnect apparatus exchanges the transmission wavelengths and targets of said optical switch between said wavelength tunable transponder and said wavelength tunable repeater.

13. The optical crossconnect apparatus according to claim 12, wherein said wavelength tunable repeater includes:
- an optical receiver for receiving the optical signal from the optical switch and converting to an electric signal;
- an overhead processor for providing overhead processing for the electric signal from the optical receiver; and
- a wavelength tunable optical transmitter for converting the electric signal from the overhead processor to an optical signal having a arbitrary wavelength depending upon control of the monitoring controller, and transmitting the optical signal to the optical switch.

14. The optical crossconnect apparatus according to claim 12, wherein said apparatus confirms the health of non-working paths by transmitting and receiving said in-channel control signal.

\* \* \* \* \*